June 16, 1931. C. R. PATON 1,809,986
RADIATOR SUPPORT
Filed March 3, 1928

INVENTOR.
Clyde R Paton
BY
P. W. Pomeroy
ATTORNEY

Patented June 16, 1931

1,809,986

UNITED STATES PATENT OFFICE

CLYDE R. PATON, OF SOUTH BEND, INDIANA, ASSIGNOR TO THE STUDEBAKER CORPORATION, OF SOUTH BEND, INDIANA, A CORPORATION OF NEW JERSEY

RADIATOR SUPPORT

Application filed March 3, 1928. Serial No. 258,877.

This invention relates to radiators for motor vehicle engines and particularly to means for supporting the same on the vehicle chassis.

Heretofore, vehicle radiators have always been very rigidly supported by and secured to the vehicle chassis at two or more points. This rigid two point suspension causes severe twisting stresses to be transmitted from the chassis frame to the radiator core because of the fact that the frame side members twist and move out of the same horizontal plane, thereby setting up a plurality of twisting stresses. The radiator core is constructed of a number of thin-walled metal tubes and will only stand a small amount of twisting stress before they will rupture. Hence it is the principal object of this invention to provide means for resiliently supporting a radiator on a vehicle frame which eliminates the possible transfer of twisting stresses from the frame to the radiator core.

Another object is to provide a motor vehicle chassis with means for resiliently supporting a radiator thereon at one point only, whereby twisting stresses will not be transferred from the frame to the radiator core.

Another object is to provide a motor vehicle chassis with a resilient support for the radiator thereof comprising a strap member secured intermediate its ends to the radiator approximately at the central axis thereof, and secured at its ends to the chassis frame whereby the radiator may pivot about its central axis upon movement of one frame side member relative to the other.

A further object is to provide a motor vehicle chassis with a resilient support for the radiator thereof comprising a laminated strap member having its ends bent downwardly and secured to the frame and having its central portions secured to the radiator approximately at the central axis thereof and a rubber block spacing the central portion of the strap from the cross member, whereby the strap member is adapted to flex upon relative movement of the frame side members to prevent the transfer of twisting stresses from the frame to the radiator.

These being among the objects of the present invention, the same consists of certain features of construction and combinations of parts to be hereinafter described with reference to the accompanying drawings and then claimed, having the above and other objects in view.

In the accompanying drawings which illustrate a suitable embodiment of the present invention, Figure 1 is a front elevation of a vehicle radiator showing the same supported by the frame cross member.

Figure 1:
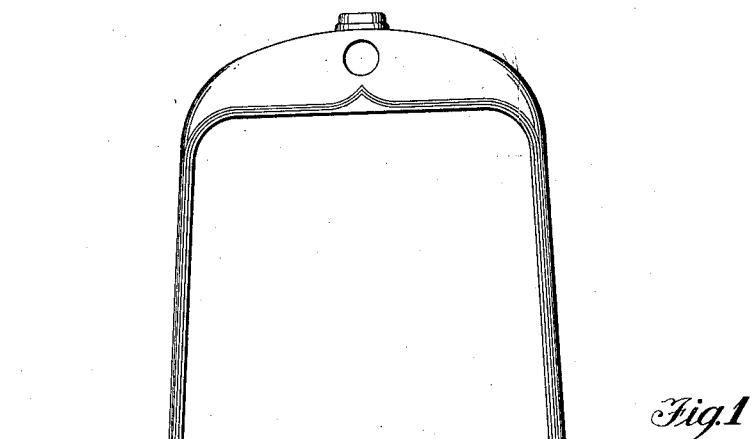
Figure 2:
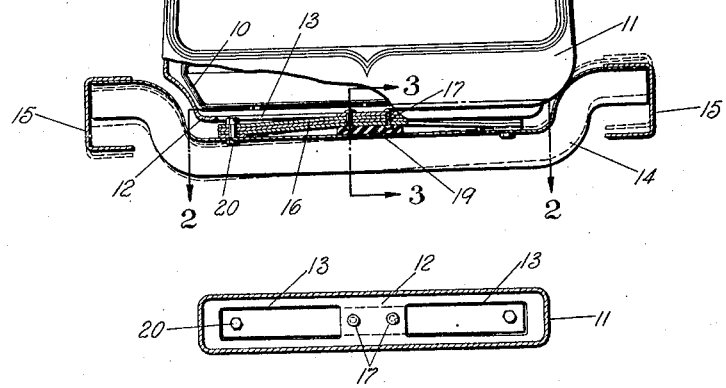
Figure 2 is a section taken on the line 2—2 of Figure 1 showing the openings in the radiator shall which permit movement of the strap member.
Figure 3:
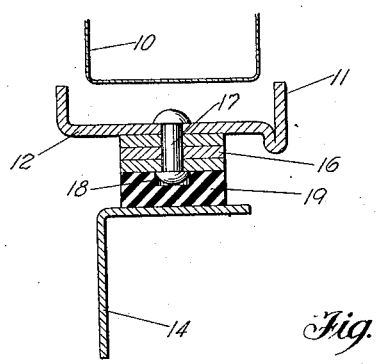
Figure 3 is a section taken on the line 3—3 of Figure 1 showing the laminated strap and bumper block in section.

Referring to the accompanying drawings in which like numerals refer to like parts throughout the several views, the radiator core 10 is suitably supported within and secured to the radiator shell 11 in a conventional manner (not shown). The radiator shell 11 is flanged inwardly around its entire perimeter and the lower flange 12 thereof is provided with a pair of slots 13, each being positioned at one side of the center thereof for a purpose to be presently described. A flexible strap member 16 built up of a plurality of long rectangular metallic strips extends longitudinally of the vehicle radiator and is secured midway between its ends by rivets 17 or other suitable means to the lower face of the bottom flange 12 of the radiator shell 11 approximately at the central axis thereof. The lower heads of the rivets 17 seat in depressions 18 formed in the upper surface of a resilient block 19 of rubber or other suitable material which is freely supported by an angle shaped cross member 14. The cross member 14 bridges the space between the frame side members 15 and is secured thereto at its extreme ends. The free ends of the flexible strap member 16 are positioned beneath the openings 13 in the lower flange 12 of the radiator shell 11 and are bent downwardly and secured by suitable bolts 20 to the frame cross member 14, causing the resilient block 19 to be in compression.

When the vehicle is being operated over rough and uneven roads, the frame is continually subjected to torsional stresses which cause the frame side members 15 to move out of the normal horizontal plane, and assume a position such as that shown in broken outline in Figure 1. The upper portion of a conventional radiator is held against movement by brace rods and by the vehicle hood, and if the radiator were rigidly secured to the frame as in conventional constructions, the twisting stresses caused by the frame being in the position just mentioned would be transmitted to the radiator core 10 through the rigid connecton and would rupture the core which would cause the same to leak. It is impossible for this to happen in the present invention because the radiator shell 11 is supported only at its central point and the support therefor is resilient. When the frame side members 15 are subjected to torsional stresses while in the position shown in broken outline in Figure 1, the laminated strap 16 flexes to compensate for the twisting of the frame and thereby permits the radiator to remain in its normal vertical position to prevent rupturing of the same. The slots 13 in the lower flange 12 of the shell 11 allow the ends of the flexible strap 16 to move upwardly therethrough during the movement of the frame side members 15.

It can be seen that by resiliently supporting the vehicle radiator at one point only, many advantages are gained over the conventional radiator supports used in the past. It is evident that there is no possible chance of rupturing the radiator core because it is not subjected to the stresses which tend to distort the same. It is to be understood that formal changes may be made in the specific embodiment of the invention described without departing from the spirit and substance of the broad invention, the scope of which is commensurate with the appended claims.

What I claim is:

1. The combination with a motor vehicle frame having a cross member extending transversely thereof, of a radiator shell having a horizontal lower flange, a radiator core within said shell, a strap secured intermediate its ends to said lower flange substantially at the central axis thereof and secured at its ends to said cross member, and a resilient block positioned between the central portion of said strap and said cross member to permit flexing of said strap upon twisting movement of said frame to eliminate the transfer of twisting stresses from said frame to said core.

2. The combination with a motor vehicle frame having a cross member extending transversely thereof, of a radiator shell having a horizontal lower flange provided with openings therein, a radiator core within said shell, a laminated strap member secured intermediate its ends to said lower flange substantially at the central axis thereof and secured at its ends to said cross member, and a resilient block spacing the central portion of said laminated strap member from said cross member thereby providing the sole support for said radiator shell, said strap member being adapted to flex upon the twisting movement of said frame to eliminate the transfer of twisting stresses to said radiator core, and extend into said openings in said lower flange when said strap is flexed.

3. The combination with a motor vehicle frame having a cross member extending transversely thereof, of a radiator, flexible means for supporting said radiator on said cross member, and resilient means positioned between the central portion of said supporting means and cross member whereby said radiator is constrained to move vertically with said cross member and said cross member is permitted to have torsional deflection about its neutral axis without causing transverse movement of said radiator.

4. The combination with a motor vehicle frame having a cross member extending transversely thereof, of a radiator, resilient means extending longitudinally of said cross member supporting said radiator thereon at a point intermediate said radiator side walls, and resilient means positioned between said first resilient means and cross member whereby said radiator is constrained to move vertically with said cross member and said cross member is permitted to have torsional deflection about its neutral axis without causing transverse movement of said radiator.

Signed by me at South Bend, Indiana, this 1st day of March, 1928.

CLYDE R. PATON.